United States Patent [19]
Riddiford et al.

[11] Patent Number: 5,423,600
[45] Date of Patent: Jun. 13, 1995

[54] BRAKE SYSTEM WITH BRAKE GAIN SHIFTING

[75] Inventors: Bryan P. Riddiford, Spring Valley; Deron C. Littlejohn, Middletown, both of Ohio

[73] Assignee: General Motors Corporation, Detroit, Mich.

[21] Appl. No.: 195,004

[22] Filed: Feb. 14, 1994

[51] Int. Cl.6 .............................................. B60T 13/76
[52] U.S. Cl. ...................................... 303/3; 188/156; 188/158; 303/20; 303/13
[58] Field of Search ..................................... 303/13-20, 303/2-3, 91-111, 115.2, 113.1, 112; 180/197, 165, 65.1-65.8; 318/375, 376; 188/156-162, 106 F, 106 P, 181 T; 364/426.01, 426.02, 426.03, 9.62, 9.71, 161, 163, 72.1-72.6, 328, 325

[56] References Cited

U.S. PATENT DOCUMENTS

| Re. 33,663 | 8/1991 | Kade et al. | 364/426.02 |
|---|---|---|---|
| 4,270,806 | 6/1981 | Venkataperumal et al. | 303/3 |
| 4,423,363 | 12/1983 | Clark et al. | 318/375 |
| 4,425,005 | 1/1984 | Warwick | 303/3 |
| 4,550,372 | 10/1985 | Kahrs | 364/426 |
| 4,671,577 | 6/1986 | Woods | 303/3 |
| 4,673,225 | 6/1986 | Kade | 303/100 |
| 4,755,945 | 7/1988 | Kade et al. | 364/426 |
| 4,783,127 | 11/1988 | Kade et al. | 303/100 |
| 4,828,334 | 5/1989 | Salman | 303/100 |
| 4,850,650 | 7/1989 | Eckert et al. | 303/9.62 |
| 4,908,553 | 3/1990 | Hoppie et al. | 318/382 |
| 4,962,969 | 10/1990 | Davis | 303/3 |
| 4,979,391 | 12/1990 | Drake et al. | 73/129 |
| 5,000,297 | 3/1991 | Shaw et al. | 188/156 |
| 5,024,299 | 6/1991 | Shaw et al. | 188/156 |
| 5,099,186 | 3/1992 | Rippel et al. | 318/803 |
| 5,112,116 | 5/1992 | Mikhaeil-Boules et al. | 303/115 |
| 5,139,315 | 8/1992 | Walenty et al. | 303/95 |
| 5,148,883 | 9/1992 | Tanaka et al. | 180/165 |
| 5,162,707 | 11/1992 | Joseph | 318/60 |
| 5,178,403 | 1/1993 | Kemner et al. | 280/423.1 |
| 5,246,283 | 9/1993 | Shaw et al. | 303/3 |
| 5,253,929 | 10/1993 | Ohori | 303/3 |

FOREIGN PATENT DOCUMENTS

| 280478A2 | 2/1988 | European Pat. Off. |
|---|---|---|
| 418995A1 | 3/1990 | European Pat. Off. |
| 457594A2 | 5/1991 | European Pat. Off. |
| 488163A2 | 11/1991 | European Pat. Off. |
| 531200A2 | 1/1992 | European Pat. Off. |
| 508367A2 | 4/1992 | European Pat. Off. |
| 527065A1 | 6/1992 | European Pat. Off. |
| 3608370A1 | 3/1986 | Germany . |
| 4124496A1 | 7/1991 | Germany . |
| 1590473 | 6/1981 | United Kingdom . |
| 1717429 | 4/1990 | U.S.S.R. . |
| 92/15469 | 9/1992 | WIPO . |

Primary Examiner—Douglas C. Butler
Attorney, Agent, or Firm—Anthony L. Simon

[57] ABSTRACT

In a motor vehicle braking system wherein a first brake device has a first mode of operation in which power-assisted braking is provided and a second mode of operation in which manual braking is provided, wherein the second braking system has a second brake device controlled by a control command, a method of controlling the braking system comprising the steps of receiving a signal indicative of an operator brake request, determining the control command in response to the signal and a first gain factor if the first brake device is in the first mode of operation, determining the control command in response to the signal and a second gain factor if the first brake device is in the second mode of operation, wherein the second gain factor is less than the first gain factor, applying the control command to the second brake device.

8 Claims, 14 Drawing Sheets

"COPRIGHT, 1993, GENERAL MOTORS CORP."

"COPYRIGHT, 1993, GENERAL MORTORS CORP."

BRAKE SYSTEM WITH BRAKE GAIN SHIFTING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to electric vehicles and more particularly, electric vehicles with regenerative braking. The subject of this invention relates to the subject of copending patent applications, U.S. patent application Ser. No. 08/196,351, 08/195,225, 08/196,026 and 08/195,242, each filed Feb. 14, 1994, concurrently with this application, assigned to the assignee of this invention, and having a disclosure that is incorporated herein by reference.

BACKGROUND OF THE INVENTION

Typically, electric vehicles drive electric motors based on electric power stored in batteries having a limited power storage capability.

SUMMARY OF THE PRESENT INVENTION

Advantageously, this invention provides a method of controlling a brake system of a type suitable for use in an electric vehicle. Advantageously, according to this invention the brake system has two modes of operation. In a first mode, where a first brake device, such as front hydraulic brake actuators, are operational, a second brake device, such as the rear brakes, has a higher gain and in a second mode where the first brake device is not operational, the second brake device has a lower gain.

Advantageously, according to this invention, a brake torque command is determined in response to operator depression of the brake pedal according to a selected gain factor. If the system is in power mode, i.e., the hydraulic brake actuators are operational, a first gain factor is selected. If the system is in manual mode, i.e., both the hydraulic brake actuators are not operational, a second gain factor is selected, wherein the first gain factor is greater than the second gain factor. When the rear brake commands and retard requests are determined, which are both determined either directly or indirectly in response to the selected gain, they are thus scaled properly for either power braking mode or manual braking mode.

Structurally, according to this invention, in a motor vehicle braking system wherein a first brake device has a first mode of operation in which power-assisted braking is provided and a second mode of operation in which manual braking is provided, wherein the second braking system has a second brake device controlled by a control command, a method of controlling the braking system comprises the steps of receiving a signal indicative of an operator brake request, determining the control command in response to the signal and a first gain factor if the first brake device is in the first mode of operation, determining the control command in response to the signal and a second gain factor if the first brake device is in the second mode of operation, wherein the second gain factor is less than the first gain factor, and applying the control command to the second brake device.

A more detailed description of this invention is set forth below.

DETAILED DESCRIPTION OF THE INVENTION

Figure 1:
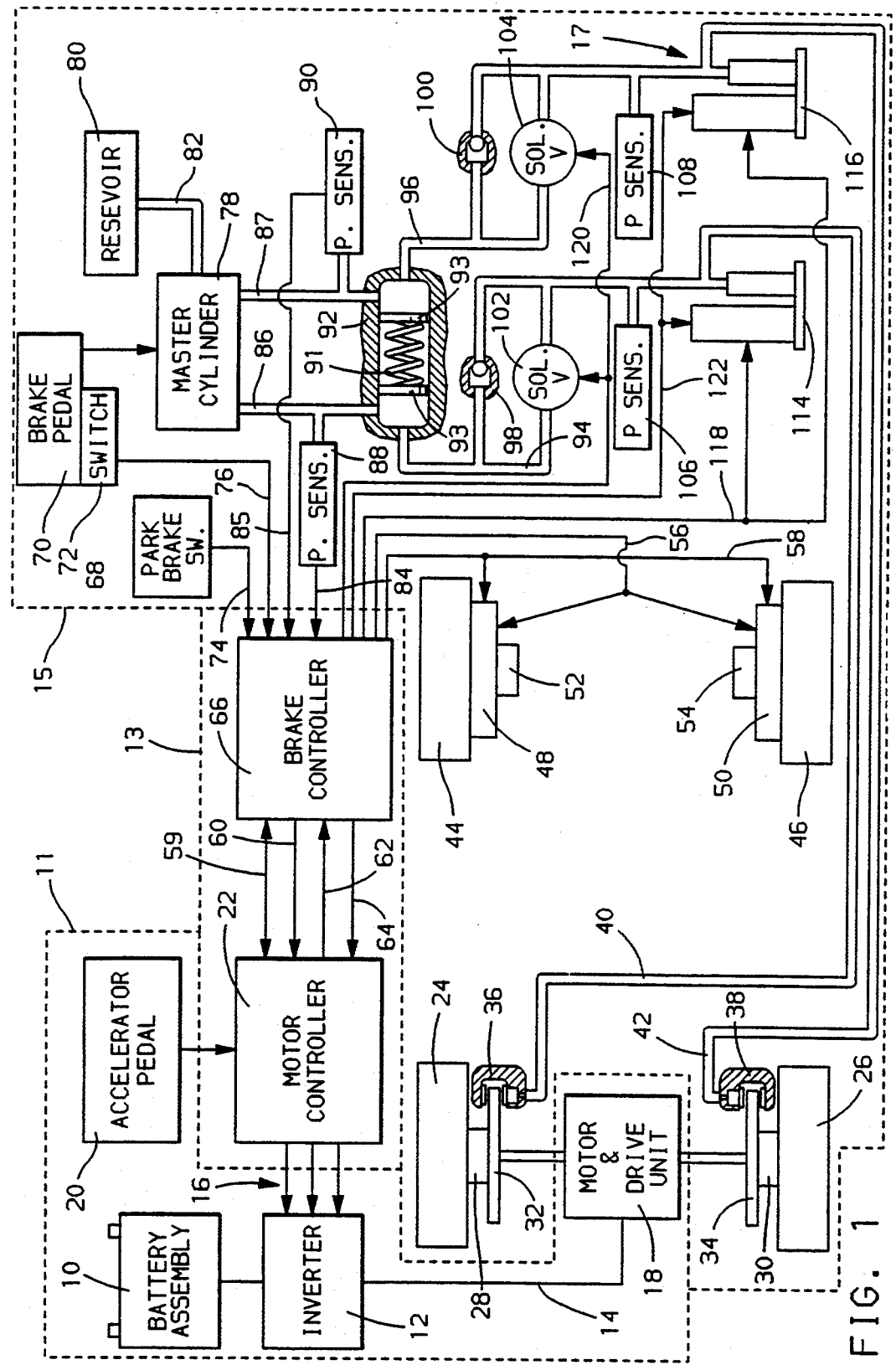
FIG. 1 illustrates schematically an example vehicle including the brake system according to this invention.

Referring to FIG. 1, an example vehicle for implementing the brake system of this invention comprises electric motor propulsion system 11, brake system 15 and control unit 13. The electric motor propulsion system 11 includes battery pack 10, inverter 12 (for use with AC motors), accelerator pedal 20 and electric motor 18. Brake system 15 includes brake pedal 70, hydraulic braking system 17 and electric drum brakes 48 and 50. Control unit 13 includes motor controller 22 for controlling the propulsion system 11 and brake controller 66 for controlling brake system 15.

In the propulsion system 11, battery pack 10 supplies power to the vehicle systems and power invertor 12 responds to motor controller 22 for controlling electric motor 18. Motor 18 provides both drive force to vehicle drive wheels 24 and 26 and regenerative braking by generating power, when commanded, and coupling the generated power to battery pack 10, providing braking torque to wheels 24 and 26. An example motor drive and recharge system, suitable for use as inverter 12 and motor 18 (assuming a three phase AC motor 18 is used), is set forth in U.S. Pat. No. 5,099,186, assigned to the assignee of this invention and having a disclosure that is incorporated herein by reference.

Accelerator pedal 20 provides an accelerator command to motor controller 22, which responsively controls invertor 12 via command line 16 to provide power to motor 18 and thereby provide motive drive force to drive wheels 24 and 26.

In brake system 15, hydraulic brake system 17 comprises master cylinder 78, hydraulic lines 40, 42, 86, 87, 94 and 96 accumulator 92, actuators 114 and 116, solenoid valves 102 and 104, brake calipers 36 and 38 and disc brakes 32 and 34. Brake controller 66 responds to operator depression of brake pedal 70, providing brake information to motor controller 22 and controlling the hydraulic brake system, including solenoid valves 102 and 104, actuators 114 and 116, and electric rear brakes 48 and 50. Bypass valves 98 and 100 allow excess pressure from actuators 114 and 116 to flow to accumulator 92. Brake controller 66 also monitors the various rotational speeds of vehicle wheels 24, 26, 44 and 46 through speed sensors 28, 30, 52 and 54.

The battery pack 10 can be any battery pack or rechargeable electric power storage device suitable for use in an electric vehicle. Power invertor 12 is used when motor 18 is one or more AC motors. If one or more DC drive motors are used, power invertor 12 is not necessary and may be replaced with an appropriate DC motor controller of a type well known to those skilled in the art.

The motor drive unit 18 may be a single drive motor driving both wheels 24 and 26, may be two motors connected back-to-back driving wheels 24 and 26, or may be a two or more motors with each motor incorporated into each wheel assembly. Additionally, the motors may be AC motors or DC motors, including one or more brushless DC motors.

The motor controller 22 may be any microcomputer based controller suitable for providing control commands to the type of motor used. Accelerator pedal 20 responds to operator foot commands in a conventional manner, providing output signals through an actuator for converting pedal position to an electric signal. Preferably, the actuator comprises redundant potentiometers that provide two or more pedal position signals to motor controller 22. This type of accelerator pedal may be easily implemented by those skilled in the art.

Brake controller 66 may be any microprocessor based controller suitable for providing output commands to actuators 114 and 116, rear brakes 48 and 50 and valves 102 and 104 and for receiving input signals from the parking brake switch 68, brake pedal switch 72 and pressure transducers 88, 90, 106 and 108.

The brake pedal 70 may be a conventional brake pedal and switch 72 may be a conventional brake pedal switch of a known type commonly used to turn on rear brake lights (not shown). The master cylinder 78 is a conventional master cylinder with a reservoir 80. The accumulator 92 has expansion chambers on either side allowing accumulation of hydraulic fluid by compression of center spring 91. Pressure transducers 88 and 90 may be any suitable type of transducers for providing signals indicative of the pressure in brake lines 86 and 87. Valves 102 and 104 are solenoid valves normally opened and being controllable to isolate hydraulic lines 94 and 96 from lines 40 and 42, respectively, when a command is received through command line 120.

Actuators 114 and 116 may be existing anti-lock brake actuators with the requirement that the actuators be capable to independently provide pressure in hydraulic lines 40 and 42 responsive to commands on line 118. Actuators 114 and 116 are of the type set forth in U.S. Pat. Nos. 4,850,650 and Re. 33,663, both assigned to the assignee of this invention and both having disclosures that are incorporated herein by reference.

Brake calipers 36 and 38 are conventional hydraulic disc brake calipers for use with conventional brake discs 32 and 34. An example of the front brake system is set forth in U.S. patent application, Ser. No. 07/942,015, filed Sep. 8, 1992, assigned to the assignee of this invention, and having a disclosure that is incorporated herein by reference.

Electric brakes 48 and 50 for rear wheels 44 and 46 may be any suitable electric brake. Example electric drum brakes are set forth in U.S. Pat. Nos. 5,000,297 and 5,024,299, both assigned to the assignee of this invention and both having disclosures that are incorporated herein by reference. Examples electric drum brakes are also set forth in United States Patent Applications, Serial Nos. 07/963,179, filed Oct. 19, 1992, and 07/720,087, filed Jan. 24, 1991, both assigned to the assignee of this invention and both having disclosures that are incorporated herein by reference.

Speed sensors 28, 30, 52 and 54 are well known to those skilled in the art and may be of the type commonly used in anti-lock brake systems.

In the vehicle shown, the propulsion system may be controlled in any known or useful manner suitable for the vehicle shown, including control to provide regenerative braking and blending of the regenerative braking with friction braking by the brake system in a known manner. Additionally, a non-compete function may be implemented where the accelerator pedal input and brake pedal inputs are summed in a known manner and do not compete for torque control of the same wheel.

According to this invention, the brake system shown runs a diagnostic test either with every vehicle start-up or at predetermined intervals to determine the functionality of the hydraulic brake actuators 114 and 116 or the remainder of the front hydraulic brake system. In the event that the front brake system is determined not to be completely operational, the actuators 114 and 116 are shut down and valves 102 and 104 are set in the open position. In this state, the front brake system acts as a manual braking system.

When the actuators 114 and 116 are operational, they provide a boost to the front brake system, for example, on the order of 5 to 1. When the actuators 114 and 116 are not operational, they do not provide a boost to the front brake system. To properly balance the entire vehicle brake system, according to this invention, the remainder of the vehicle braking devices, such as the rear electric drum brakes and regenerative braking from the electric motor, if provided, are scheduled from the front brake system. According to this invention, the scheduling of the gains of the vehicle brake systems depends upon the operational status of the front brake actuators to achieve, through gain shifting, appropriate balancing of the vehicle brake systems with respect to each other.

Figure 2:
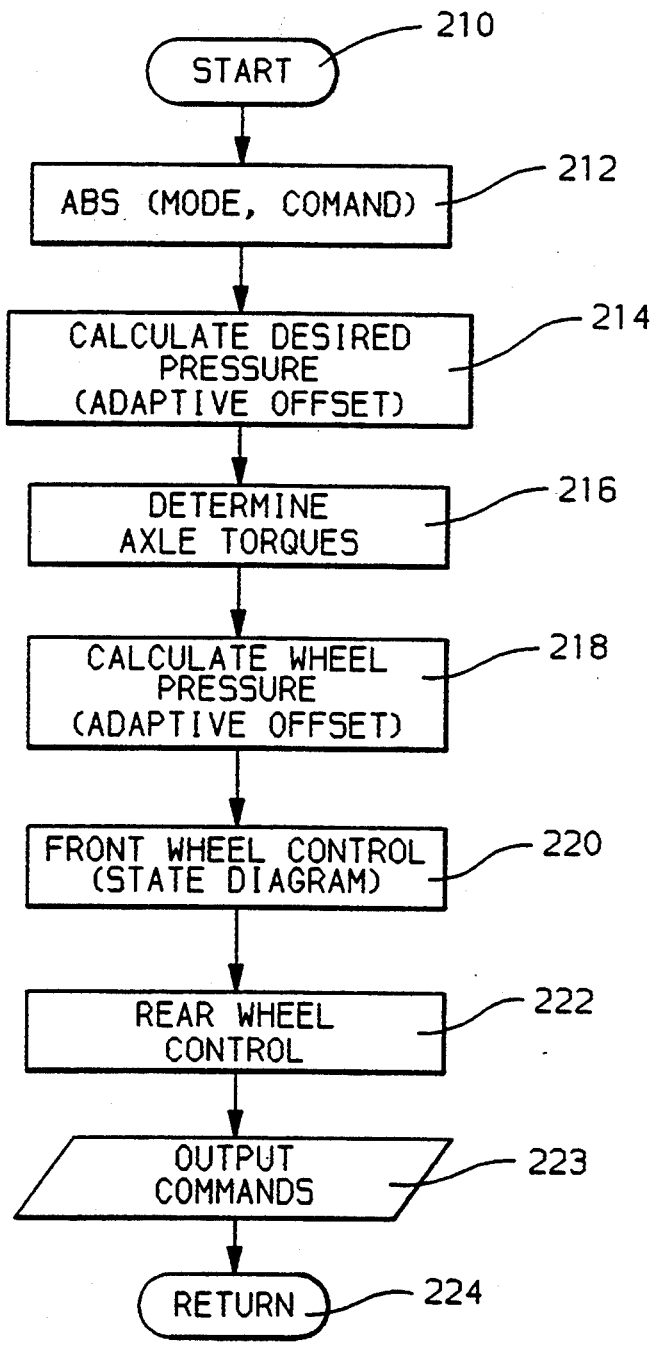
FIGS. 2, 3, 4, 5, 6, 7, 8a, 8b, 8c, 9a, 9b, 10a and 10b comprise flow diagrams for an example brake control flow routine according to this invention.

Referring now to FIG. 2, a general flow of the brake controller flow routine according to this invention is illustrated starting at block 210 and moving to block 212, where an ABS control algorithm (optional) is run. In general, the ABS control algorithm is a typical anti-lock brake system control algorithm of a type well known to those skilled in the art that: (a) determines whether or not the vehicle is in anti-lock braking mode (setting a flag in response to this determination) and (13) if so, determines the anti-lock braking torque command for each wheel.

The routine then moves to block 214 where a subroutine is run to the calculate desired brake pressure responsive to operator depression of the brake pedal and also an adaptive offset routine to continuously determine the offset for master cylinder hydraulic line pressure sensors (i.e., sensors 88, 90, FIG. 1) when braking is not applied. The routine then moves to block 216 where a subroutine determines the mount of regeneration to be requested of the front motor controller and the front and rear brake torque commands. After block 216, the routine moves to block 218 where a subroutine adaptively determines the offsets for the hydraulic brake line pressure sensors (i.e., for sensors 106, 108, FIG. 1).

After block 218, the routine moves to block 220, where a subroutine runs the front wheel brake actuator control routines in accordance with the state diagram described below with reference to FIG. 8. At block 222, a rear wheel brake control is implemented. The rear wheel brake control routine may be any suitable routine of a type known to those skilled in the an for controlling the rear electric drum brakes according to the rear brake torque command. Alternatively, if the rear electric drum brakes are replaced with hydraulic brakes similar to the front brakes, a routine similar to block 220 and FIGS. 9-14, may be implemented to control the rear brakes.

At block 223, the front and rear actuator commands are output to control the front and rear brake actuators. The controller then exits the main flow routine at block 224.

Figure 3:
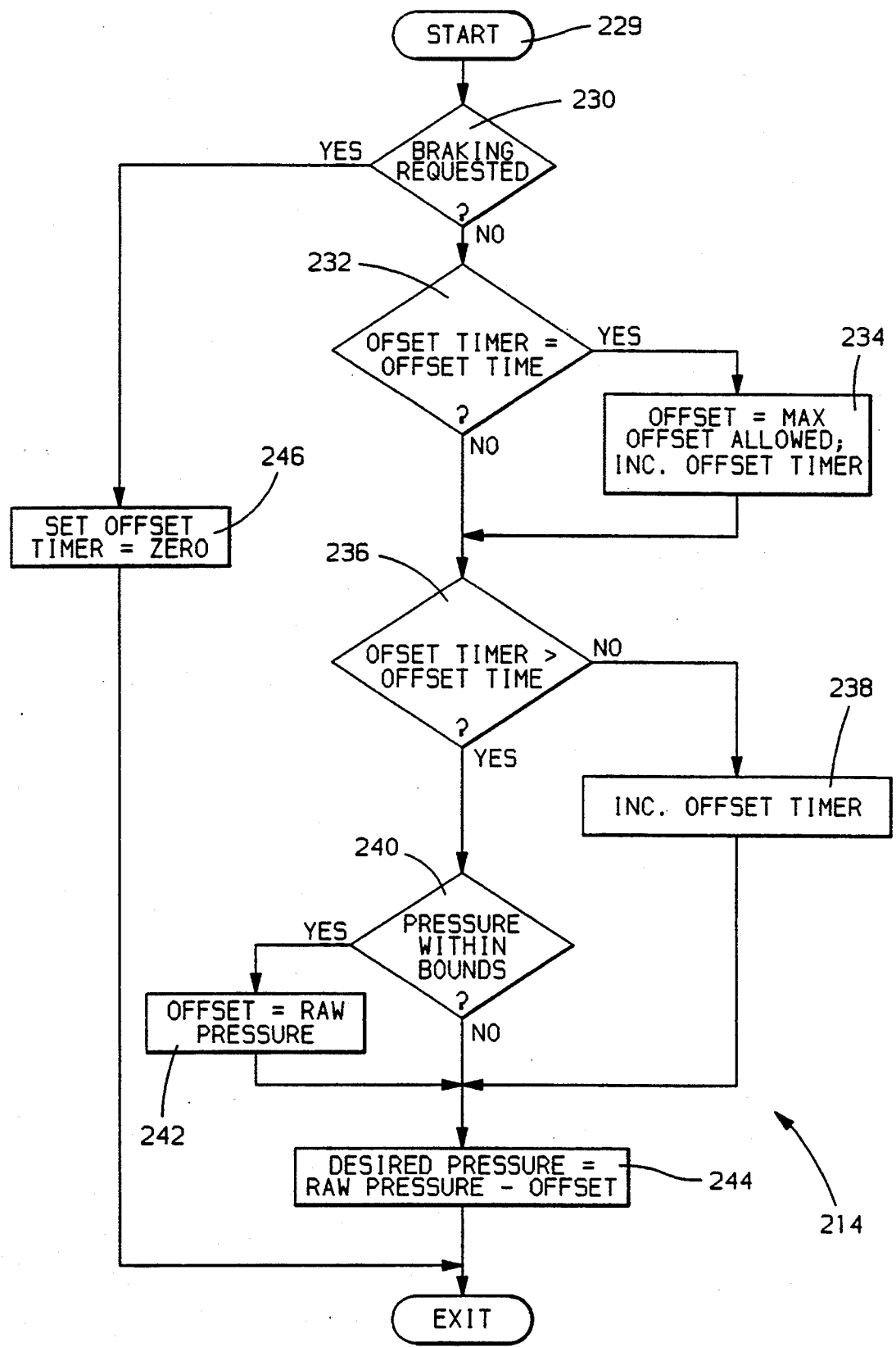

Referring now to FIG. 3, the subroutine for calculating the desired pressure and the adaptive offsets for the master cylinder pressure sensors begins at block 229. At block 230, the routine determines if braking is requested in response to either: (a) a sensed depression of the brake pedal via the brake switch or (b) both master cylinder pressure sensors provide output values higher than their set point values, indicating brake pedal depression. If braking is requested, as determined by either one of these tests, the routine moves to block 246 where the offset timer is set to zero and then to block 244 where the signal DESIRED PRESSURE for each sensor is set equal to the signal RAW PRESSURE from each pressure sensor subtracted by the sensor offset value stored in memory.

The offset for each sensor is initially set to the maximum allowed value and, when no braking is or has been requested for a predetermined time period, is continuously updated in the part of the routine indicated by blocks 232–242.

More particularly, if at block 230 braking was not requested, the routine moves to block 232 where the OFFSET TIMER is compared to the value OFFSET TIME. OFFSET TIMER keeps track of the amount of time since braking was last requested. (Note: When braking is requested, block 246 resets the offset timer to zero.) The predetermined value of OFFSET TIME sets the time period for which no braking must be applied before the offset is updated. If at block 232 the offset timer is not equal to the offset time, the routine moves to block 236. At block 236, the routine determines if OFFSET TIMER is greater than OFFSET TIME. If not, the routine moves to block 238 where OFFSET TIMER is incremented and continues to block 244.

If at block 232 the offset timer is equal to the offset time, the adaptive updating of the sensor offsets begins at block 234 where the offset for each sensor is set to the maximum offset allowed and OFFSET TIMER is incremented. At block 236, OFFSET TIMER is now greater than OFFSET TIME so the routine continues to block 240 where it compares the pressures from both of the master cylinder pressure sensors (88 and 90) and runs a simple boundary test. If both sensors are within a predetermined range of each other and if both sensor outputs are below the highest allowed offset pressure, this test is passed. If not, the routine maintains the offsets at the previously determined values and continues to block 244.

If the pressure bounds test is passed at block 240, the routine moves to block 242 where the offset for each sensor 88, 90 is updated equal to the read signal, RAW PRESSURE, from each master cylinder pressure sensor 88, 90. Thus, at block 244, the signal DESIRED PRESSURE for each of the master cylinder brake lines is determined responsive to the raw pressure of each sensor 88, 90 and the offset of each sensor 88, 90.

Accordingly, then, this invention provides adaptive offset updating to the brake system pressure sensors. Implementing the adaptive updating routine set forth above, this invention controls the hydraulic brake system including pressure transducers for outputting brake pressure signals responsive to brake pedal depression and indicative of operator-desired braking. When the brake pedal is depressed, a brake command is determined in response to the pressure transducer output and a stored offset value. When the brake pedal is not depressed, a timer commences running.

If, while the timer is running, the brake pedal is depressed, the timer is reset and the braking is controlled as indicated above. If the timer times out before the brake pedal is depressed again, the pressure transducer signals are monitored and compared to predetermined limit values indicative an acceptable range of output values when the pedal is not depressed. If the pressure transducer signals are within the predetermined limit values, the stored offsets are updated to equal the present pressure transducer output signals. Otherwise, if the pressure transducer signals are not within the predetermined limit values, the offsets are not updated. Thus, this invention provides updates to the brake line transducer signals during periods of no brake pedal depression, accounting for aging of the transducers, and change of environment, i.e., elevation above sea level, which may affect the transducer outputs.

Figure 4:
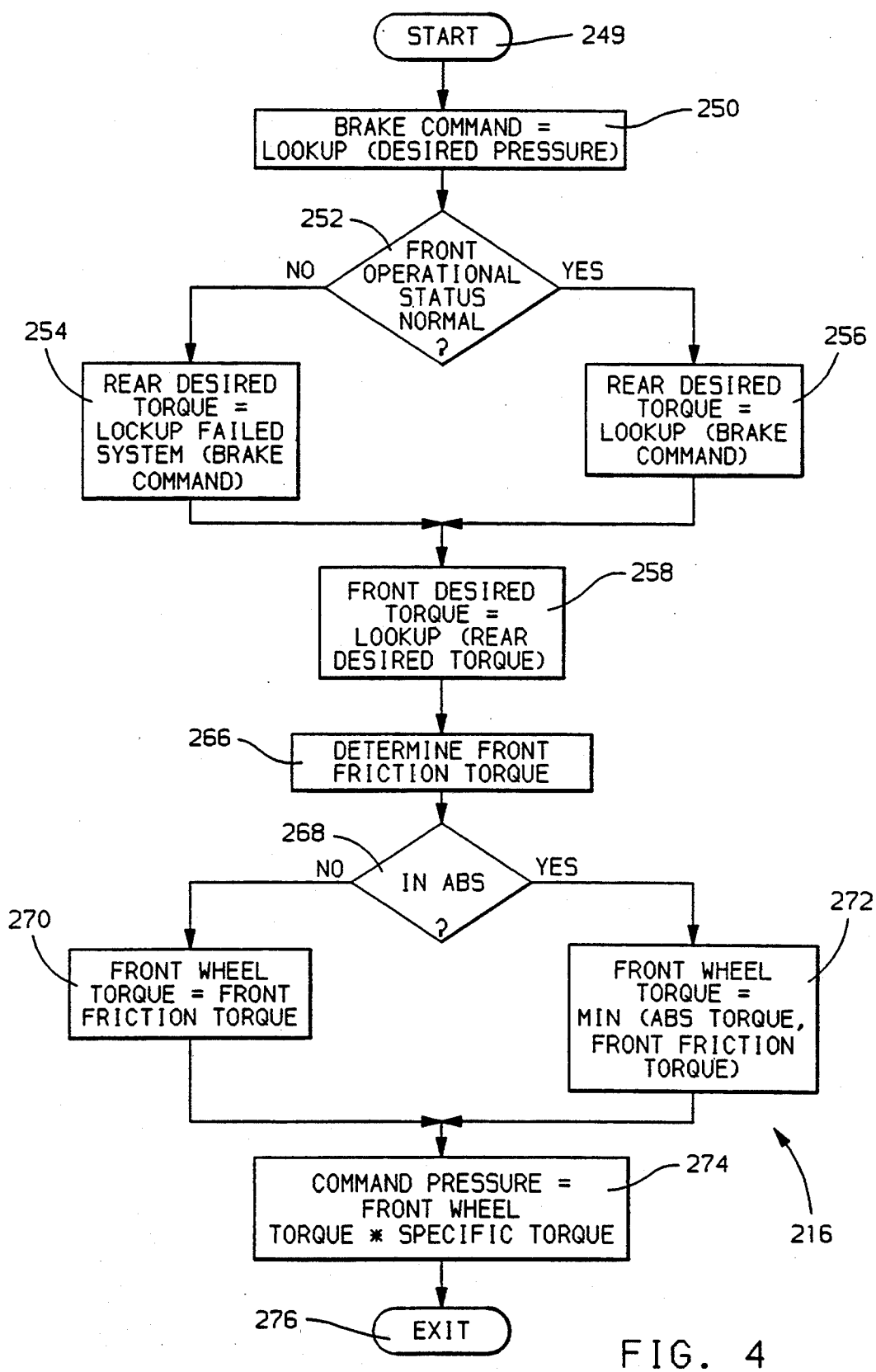
Figure 5:
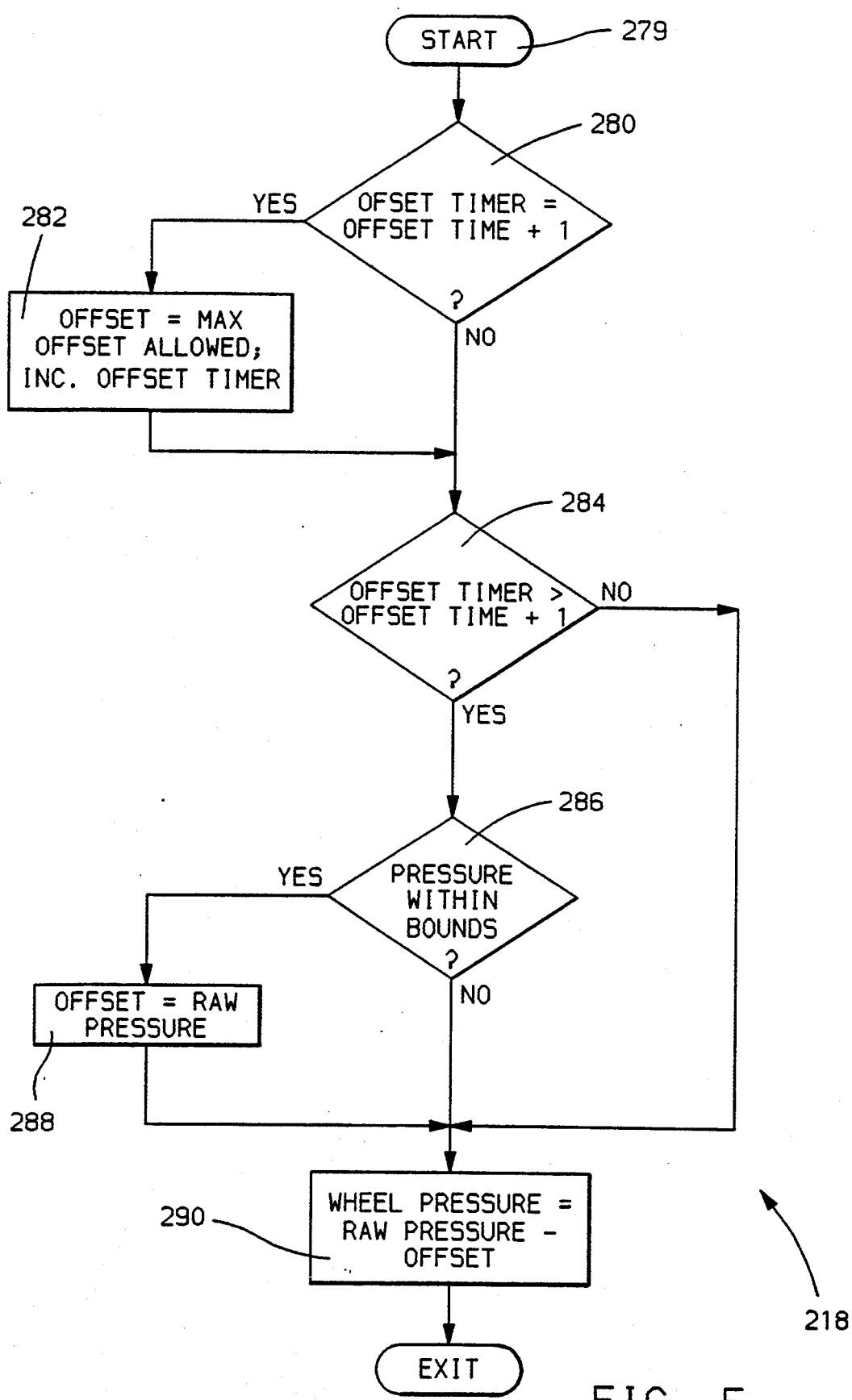

Referring now to FIGS. 4 and 5, the flow diagram illustrated comprises the steps the controller takes in determining the brake torque command, the front and rear brake; torque commands, the retard request provided to the motor controller and the front friction brake commands. The subroutine starts at block 249 and moves to block 250 where the signal BRAKE COMMAND (referred to as brake torque command above), representative of total torque required to slow the vehicle down in response to the driver requested braking, is retrieved from a look-up table in memory in response to the signal DESIRED PRESSURE (the greater of the values for the two master cylinder pressure lines is used). Typically, this look-up table performs the function:

BRAKE COMMAND = DESIRED PRESSURE * (1/SPECIFIC TORQUE)

where SPECIFIC TORQUE is a constant predeterminable for the particular brake system by one skilled in the art.

At block 252, the routine checks to determine if any errors are present in the front brake system. Error may be determined by implementation of a standard ABS diagnostics routine known to those skilled in the an that tests the wheel speed sensors for open circuits, short circuits, jitter, etc. If any of these known tests fail, the ABS function is disabled and the ABS indicator light in the instrument panel is illuminated. The known diagnostics also include standard actuator tests, which check for open and short circuits, proper voltage levels, movement slip, nut test and apply/release times too long, etc. If any of these known tests fail, the corresponding channel is disabled and the opposite rear wheel brake is disabled (in a diagonal split control).

New tests according to this invention include the following. The PID errors (FIGS. 8a, 8b and 8c, below) are stored and, if the errors for a single channel are greater than a predetermined limit for a predetermined time, a failure flag is set and that channel is disabled along with the corresponding diagonal rear actuator.

The pressure sensor tests check for open circuits and shorts by sensing the line voltages, and compare the offsets to predetermined limits. If one of the master cylinder sensors 88 and 90 fails the test, the other sensor is used. If one of the actuator sensors 106, 108 fails, the corresponding actuator, and diagonal rear actuator are shut down.

If the communications link between the brake controller and motor controller fails, the regenerative braking function, if implemented is disabled. If there are dual system failures, instead of a diagonal split system, both front actuators are disabled and the system is run as a manual front system, with rear actuator operational unless a shut down is required of the rear actuators.

Testing of the rear brake actuators includes known testing methods on the rear wheel speed sensors and actuators. In general, any one or both of the rear brake actuators may be disabled at any time without adversely affecting front braking performance.

If there are errors in both actuators, the front brake system is driven in manual mode as a manual system. In manual mode, there is no power boost provided by the front actuators to aid in braking. Regenerative braking may or may not be implemented, depending upon the system. As indicated above, depending upon the state of the rear brakes, the rear brake actuators may or may not be activated. The braking response in manual mode is similar to the response of a conventional braking system in an internal combustion engine vehicle in which the vacuum boost has been disabled.

If only one actuator has an error, the brake system is run as a diagonal split system. The actuator with the error is shut down and the diagonal rear actuator is shut down (by setting the actuator commands to zero).

If the system is in manual mode, the routine moves to block 254, where the signal REAR DESIRED TORQUE is retrieved from a look-up table in response to BRAKE COMMAND. If the front brake actuators are operational at block 252, the system is in power mode and the routine moves to block 256, where the signal REAR DESIRED TORQUE is retrieved from a second look-up table in response to BRAKE COMMAND.

The first look-up table used at block 254 represents a lower gain factor for the signal REAR DESIRED TORQUE than the second look-up table used at block 256. Thus, advantageously according to this invention, in the power mode where the front brake actuators are operational, the rear brakes have a higher gain and in manual mode where the front brake actuators are not operational, the rear brakes have a lower gain.

Advantageously, according to this invention as described above, a brake torque command is determined in response to operator depression of the brake pedal according to a selected gain factor. If the system is in power mode, i.e., the hydraulic brake actuators are operational, a first gain factor is selected. If the system is in manual mode, i.e., both the hydraulic brake actuators are not operational, a second gain factor is selected, wherein the first gain factor is greater than the second gain factor. The brake torque command is then determined in response to the selected gain factors. Thus, when the rear brake commands are determined, which are determined either directly or indirectly in response to the selected gain, they will be scaled properly for either power braking mode or manual braking mode. In the electric vehicle system that uses regenerative braking, the retard request may be determined either directly or indirectly in response to the selected gain factors, and thus will also be properly scaled for either power or braking mode.

Referring again to FIG. 4, the routine continues to block 258 where the signal FRONT DESIRED TORQUE is retrieved from another look-up table in response to the signal REAR DESIRED TORQUE. Note that regenerative braking may be determined in response to the FRONT DESIRED TORQUE signal, and, thereby, gain shifting of the regenerative braking command is accounted for.

The routine then moves to block 266 where the FRONT FRICTION TORQUE command is determined. Determination of this command depends upon the system implementation. In an electric vehicle with regenerative brake blending, the front friction torque command may be determined as the difference between the FRONT DESIRED TORQUE and the retard achieved through the motor control, i.e., brake pedal and accelerator pedal summing and regenerative braking achieved. If the system is in ABS mode, regenerative braking may be disabled.

Again at block 268, the ABS mode flag is checked. If the system is not in ABS mode, the signal FRONT WHEEL TORQUE is set equal to FRONT FRICTION TORQUE. If the system is in the ABS mode, at block 272, FRONT WHEEL TORQUE is set equal to the minimum of the ABS torque command and FRONT FRICTION TORQUE. At block 274, the pressure command for the front brake hydraulic lines, COMMAND PRESSURE, is set equal to FRONT WHEEL TORQUE times SPECIFIC TORQUE. After determining COMMAND PRESSURE, the routine exits at block 276.

Referring to FIG. 5, the signals WHEEL PRESSURE, the actual hydraulic line pressures for the front brakes are determined. Also, for each line pressure sensor (106 and 108) during non-braking conditions, the offset is adaptively updated. The subroutine shown starts at block 279 and moves to block 280. If the vehicle is in a braking condition, OFFSET TIMER, as indicated above with reference to FIG. 3, is set to zero. Thus the tests at blocks 280 and 284 fail and the routine moves straight to block 290, where WHEEL PRESSURE for each brake line is set equal to RAW PRESSURE, the brake line sensor output (sensors 106 and 108), subtracted by the stored offset value for each sensor.

At block 280, if OFFSET TIMER equals OFFSET TIME plus one, the routine moves to block 282 where the offset for each sensor 106, 108 is set equal to the maximum offset allowed and the value of OFFSET TIMER is incremented. At block 284, if OFFSET TIMER is greater than OFFSET TIME plus one, which will always happen if the routine moves through block 282, the routine moves to block 286 where a short pressure test on the two actuator hydraulic lines is run. If the measured pressure outputs (RAW PRESSURE) of the two sensors 106, 108 are within the predetermined limit of each other and they are both below the maximum offset limit, the routine moves to block 288, where the offset for each sensor is reset equal to RAW PRESSURE from each sensor 106, 108. If the test lit block 286 is not passed, the routine maintains the offsets at the previously determined values and continues to block 290.

At block 290, the WHEEL PRESSURE for each actuator hydraulic line is set equal to RAW PRESSURE for each line subtracted by the determined offset for each sensor 106, 108. (Note: As indicated above with reference to FIG. 3, the adaptive updating of the offset occurs only when there is no brake activity and has been no brake activity for a predetermined time period as set by OFFSET TIME.)

Figure 6:
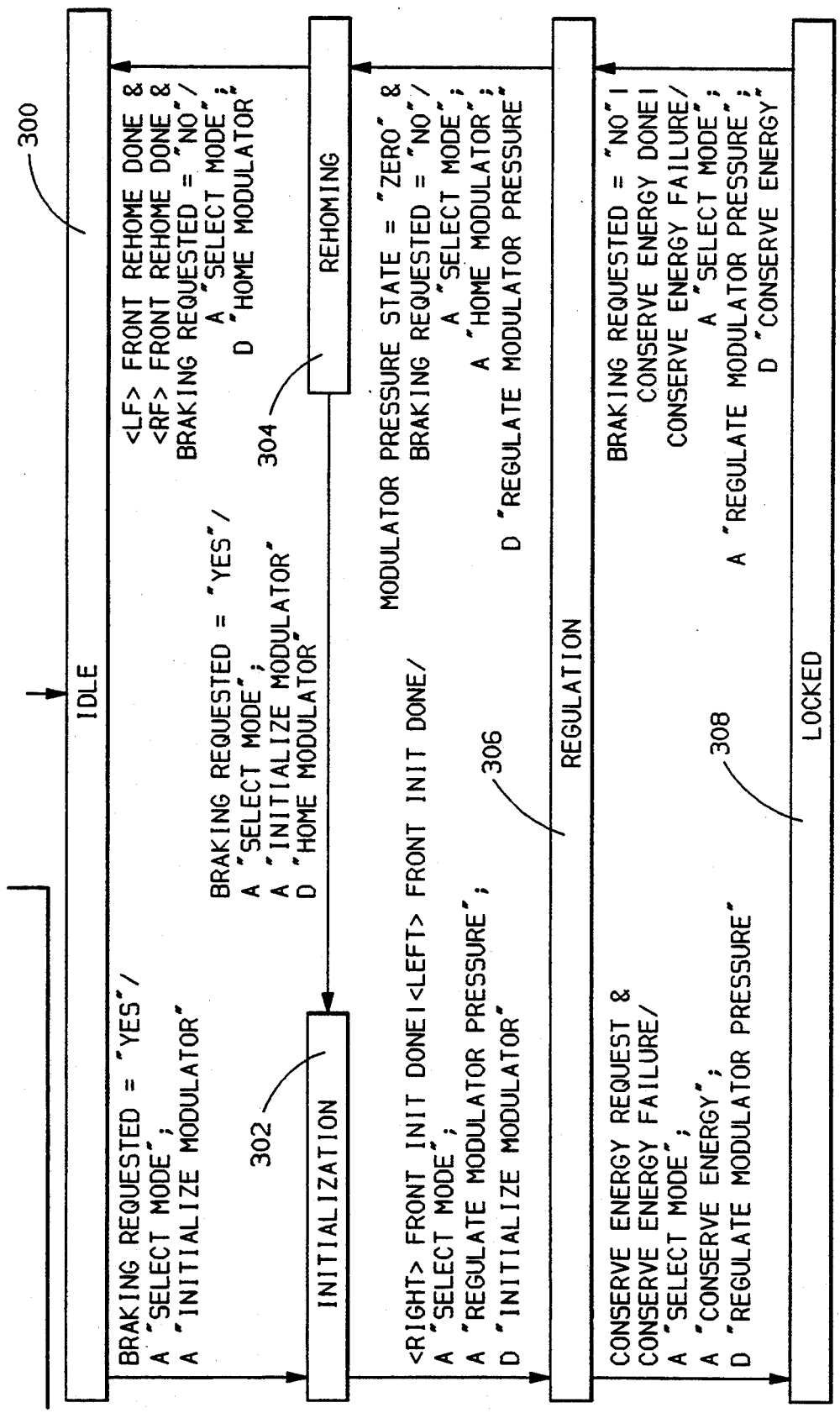

Referring now to FIG. 6, the control of the front wheel actuators is performed by a series of subroutines in a manner indicated in the front wheel control state diagram shown. In general, with each loop through the main control routine, only subroutines activated as determined by the control system state are run. Activating and deactivating appropriate subroutines may be easily achieved by controlling a set of flags according to the criteria set forth herein.

Block 300 is the IDLE state in which the front actuators are idle and occurs when there is no brake action or pedal pressure by the operator. In the IDLE state, a subroutine, SELECT MODE, is activated. The state moves from IDLE at block 300 to INITIALIZATION at block 302 when braking is requested, indicated either by line pressures as sensed by the master cylinder transducers (88, 90) or the brake pedal switch (72).

Once braking is requested, the SELECT MODE and INITIALIZE MODULATOR subroutines are activated by setting appropriate flags and the control state moves to INITIALIZATION block 302.

In general, in the INITIALIZATION state, a subroutine is run until either the front right actuator or front left actuator is initiated as indicated by a control flag, at which time the control state moves to REGULATION, block 306. When the system transfers to the REGULATION state 306, the SELECT MODE and REGULATE MODULATOR subroutines are activated and the INITIALIZE MODULATOR subroutine is deactivated by the setting of appropriate flags.

In the INITIALIZATION state 302, the front brake modulators are activated to provide an initial boost to the front brakes to prepare for braking.

In the REGULATION state 306, the front brake modulators are controlled to apply the appropriate amount of friction braking to the front and rear brakes. The control system remains in the REGULATION state at block 306 until either the CONSERVE ENERGY REQUEST flag is set and there is no conserve energy failure, in which case, the system moves to CONSERVE ENERGY state 308, or until the modulator pressure returns to zero and there is no braking requested, in which case the system moves to the REHOMING state 304.

When the system moves to the CONSERVE ENERGY state 308, the CONSERVE ENERGY and SELECT MODE subroutines are activated and the REGULATE MODULATOR PRESSURE subroutine is deactivated by the setting of appropriate flags. In the CONSERVE ENERGY state 308, the routine locks the modulators to maintain line braking pressure and remains in the conserve energy state until either braking is no longer requested by the vehicle operator, the conserve energy mode is completed or there is a failure in the conserve energy mode as indicated by appropriate flags.

When the routine leaves the CONSERVE ENERGY state 308 and moves back to the REGULATION state 306, the SELECT MODE and REGULATE MODULATOR PRESSURE subroutines are activated and the CONSERVE ENERGY subroutine is deactivated.

If the system, in the REGULATION state 306, moves to the REHOMING state 304, the brake actuators are rehomed to their enabling position until both the left front and right front actuator rehomings are completed and braking is no longer requested, at which time, the SELECT MODE subroutine is activated and the HOME MODULATOR subroutine is deactivated by the setting of appropriate flags, causing the control state to return to the IDLE state 300.

If, in the rehoming state, braking is requested, the SELECT MODE and INITIALIZE MODULATOR subroutines are activated and the HOME MODULATOR subroutine is deactivated by the setting of appropriate flags, causing the system to again move to the INITIALIZATION state 302.

The INITIALIZE MODULATOR, REGULATE MODULATOR PRESSURE, CONSERVE ENERGY and HOME MODULATOR subroutines are described below with reference to FIGS. 7, 8a, 8b and 8c, (9a and 9b) and (10a and 10b), respectively. The SELECT MODE subroutine is not illustrated in the Figures because of its simplicity, but operates as follows.

The SELECT MODE subroutine performs two tests. The first test compares the brake pressure command as sensed by the master cylinder pressure sensors to previous pressure commands, compares the actuator pressure commands to previous actuator pressure commands, and looks at the vehicle speed signal. If both the brake pressure command and the actuator pressure commands remain substantially constant for a predetermined time period and the vehicle speed is less than a predetermined speed, i.e., 5 or 10 MPH, then a flag CONSERVE ENERGY REQUEST, is set to true. If this test is failed, the CONSERVE ENERGY REQUEST flag is set to false. This flag is used to determine if the system should move into the CONSERVE ENERGY state 308.

The second test performed by the SELECT MODE subroutine simply looks at the front brake actuator line pressures as sensed by sensors 106 and 108, and if both of the pressures are substantially zero, a flag, MODULATOR PRESSURE STATE, is set to indicate ZERO. If this test is failed, the MODULATOR PRESSURE STATE flag is set to indicate VARIABLE. This flag is used to control whether the system moves into the REHOMING state 304.

Figure 7:
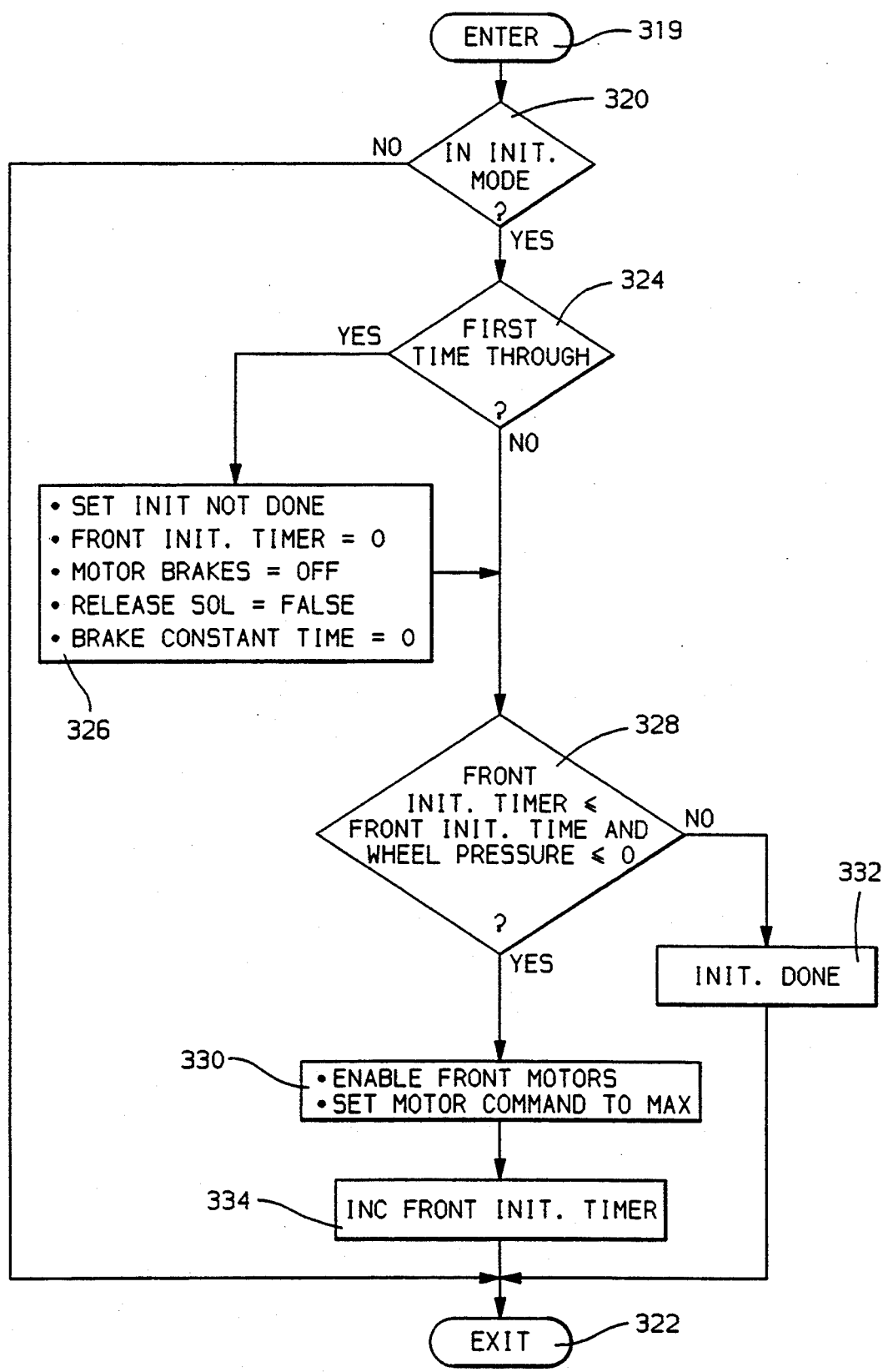
Figure 10A:
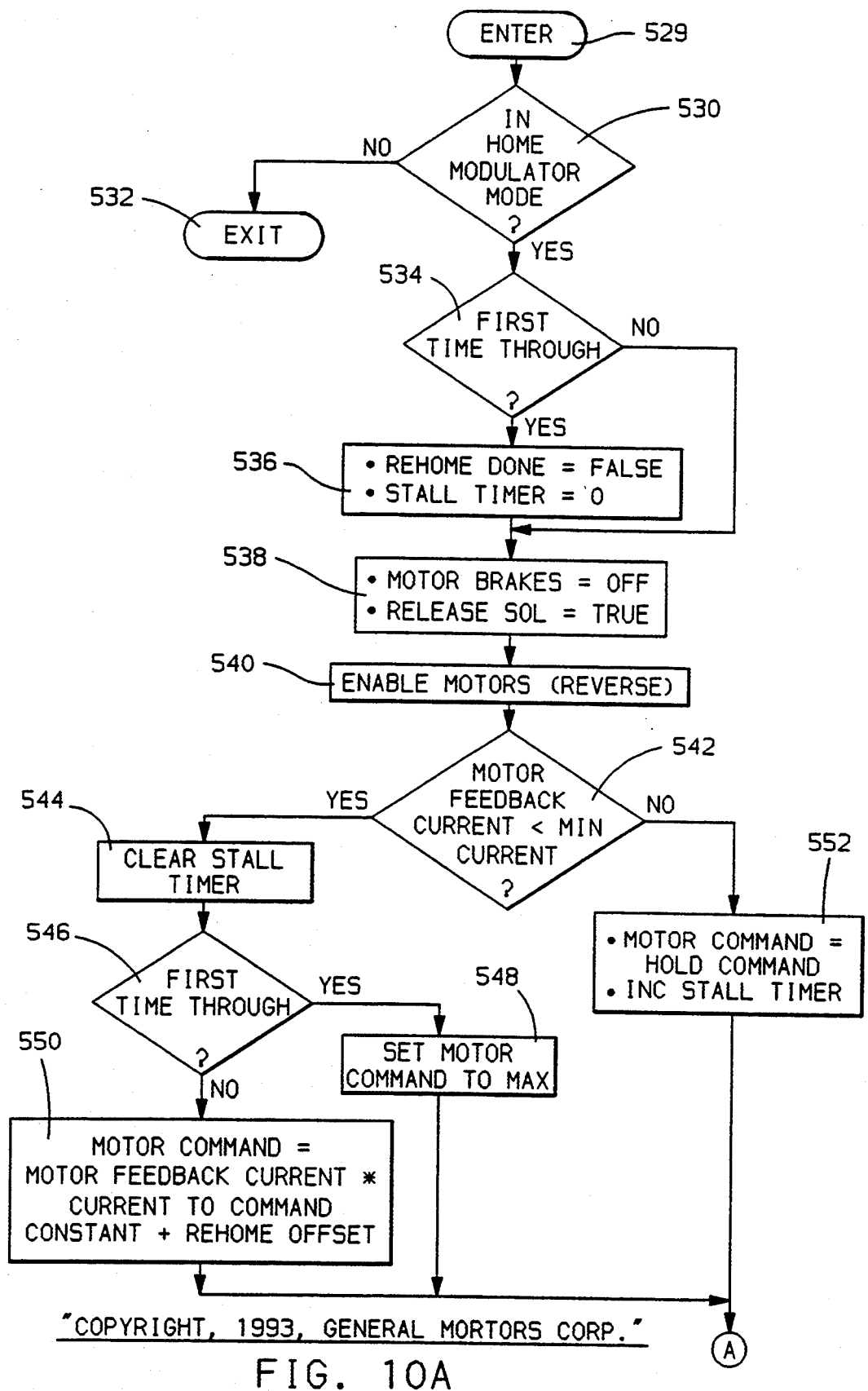
Figure 10B:
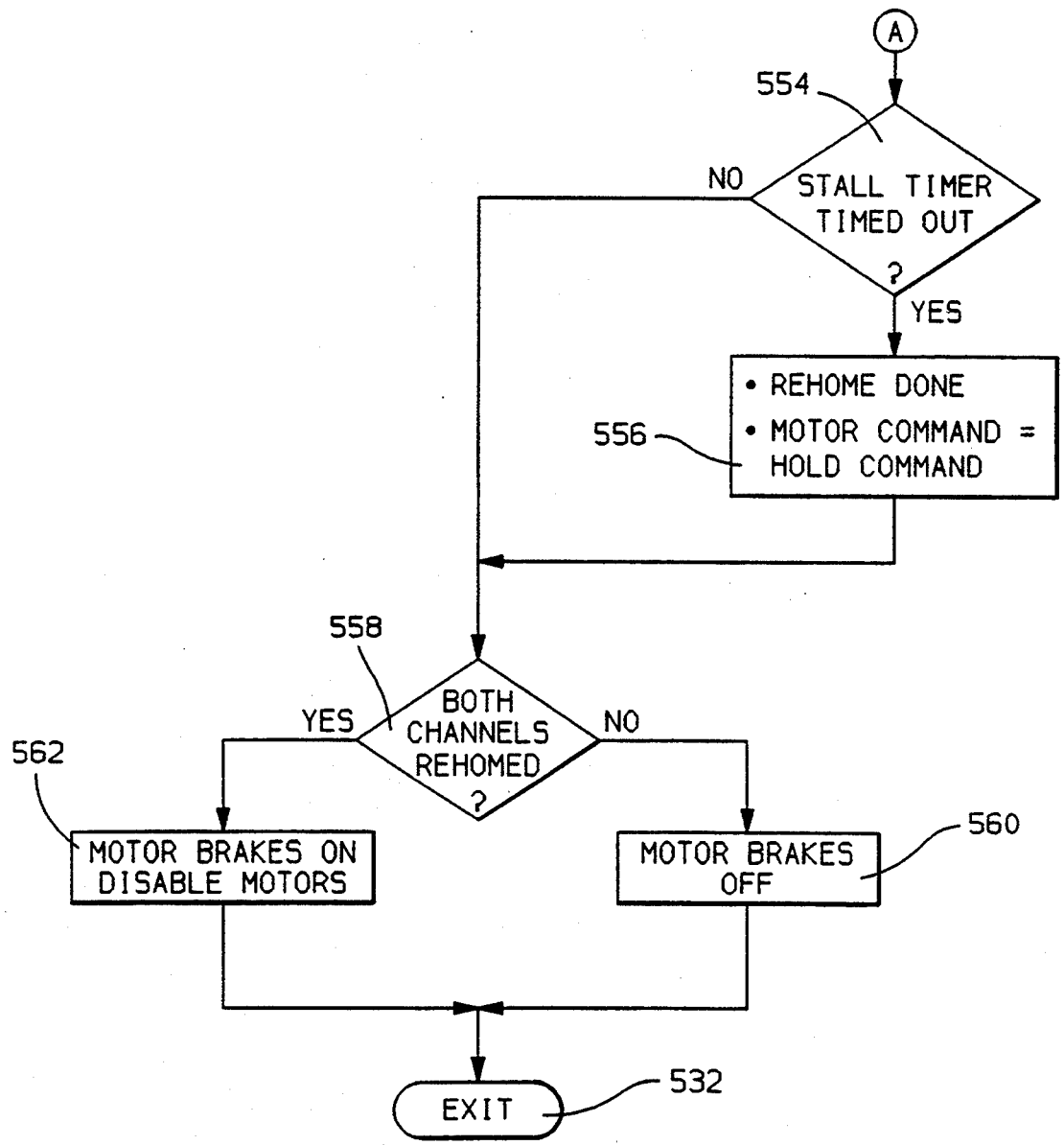

Referring to FIG. 7, the INITIALIZE MODULATOR subroutine begins at block 319. At block 320, the routine checks a flag to determine if INITIALIZE MODULATOR subroutine is activated, and, if not, the routine is exited at block 322. If the test at block 320 is passed, the routine moves to block 324 where it checks a flag to determine if this is the first time through the INITIALIZE MODULATOR subroutine for the present brake command (note: the first time flags for all of the subroutines are reset when braking is no longer requested, setting the BRAKE REQUEST=FALSE). If so, the INIT. flag is set to NOT DONE, the FRONT INIT TIMER is set to zero, the command MOTOR BRAKES, commanding the front actuator brakes, is set to OFF, RELEASE SOL is set to OFF, and the BRAKE CONSTANT TIME (variable used to monitor how long brake pressure has remained substantially constant) is set to zero. The RELEASE SOL command controls solenoid valves 102 and 104 (FIG. 1), which isolate the master cylinder hydraulic lines from the brake actuator hydraulic lines. The RELEASE SOL command controls the solenoids 102 and 104, activating the solenoids 102, 104 when the braking is requested and deactivating the solenoids after the brake pedal has been released and the actuators have been rehomed (FIGS. 10a and 10b).

The routine then continues to block 328 where it checks to determine if FRONT INIT TIMER is less than or equal to the predetermined value FRONT INIT TIME, and if the signal WHEEL PRESSURE for either of the front actuators is less than or equal to zero. If WHEEL PRESSURE is greater than zero for an actuator hydraulic line, positive pressure is in the actuator hydraulic line, indicating that the actuator for that line has been initiated, and the routine moves to block 332. At block 332, the flag INIT. is set to DONE, and the routine exits at block 322.

If at block 328 the test is passed, the routine moves to block 330 where the front motors are enabled and the command MOTOR COMMAND is set to the maximum allowed value, commanding the maximum output torque. At block 334, FRONT INIT TIMER is incremented. The routine is exited at block 322.

In general, when a brake pedal command is first sensed, the above subroutine provides a boost to the front brake actuator to eliminate any slack in the front brake system, effectively moving the brake pads close to the brake discs in preparation for friction braking.

Figure 8A:
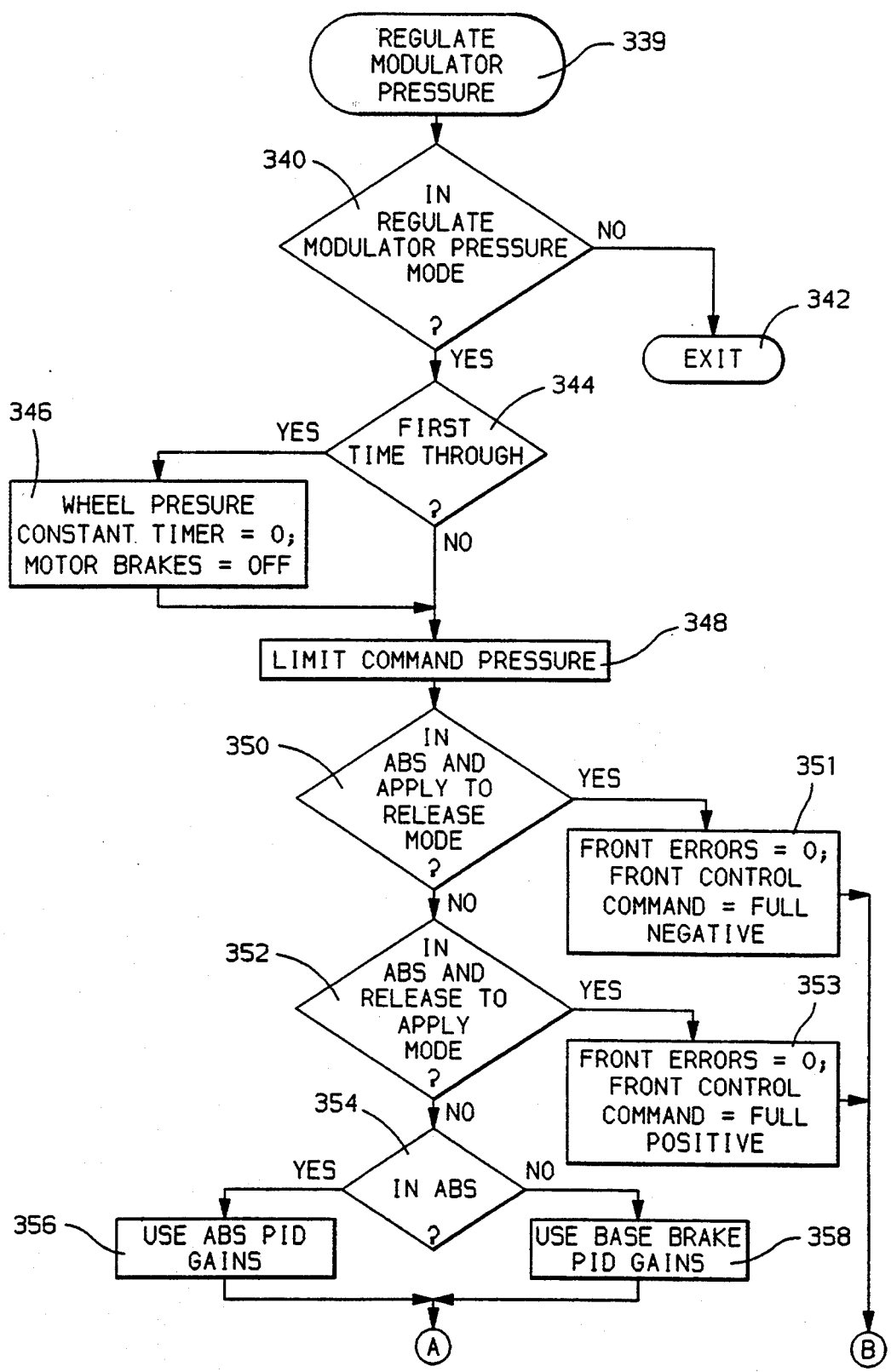
Figure 8B:
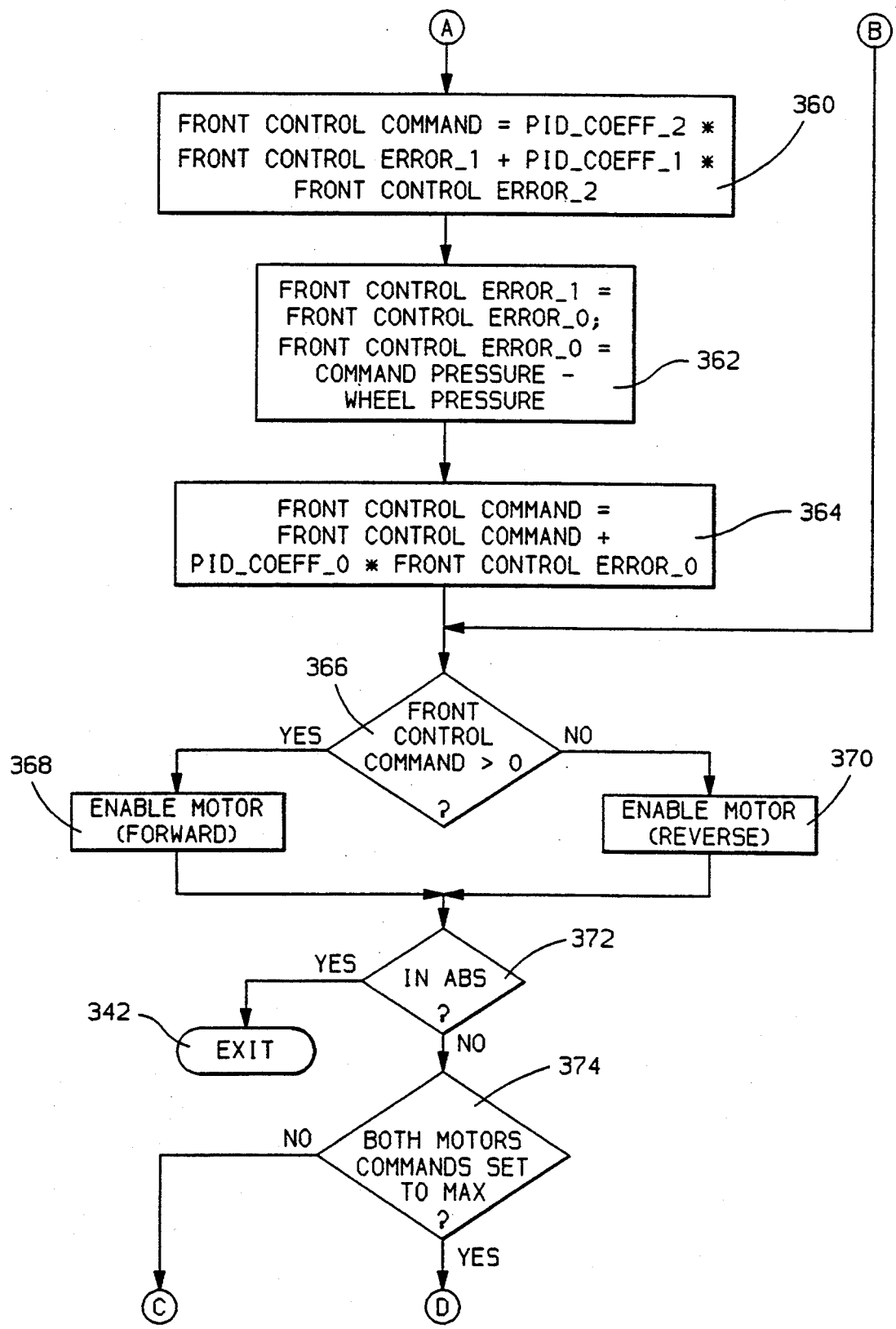
Figure 8C:
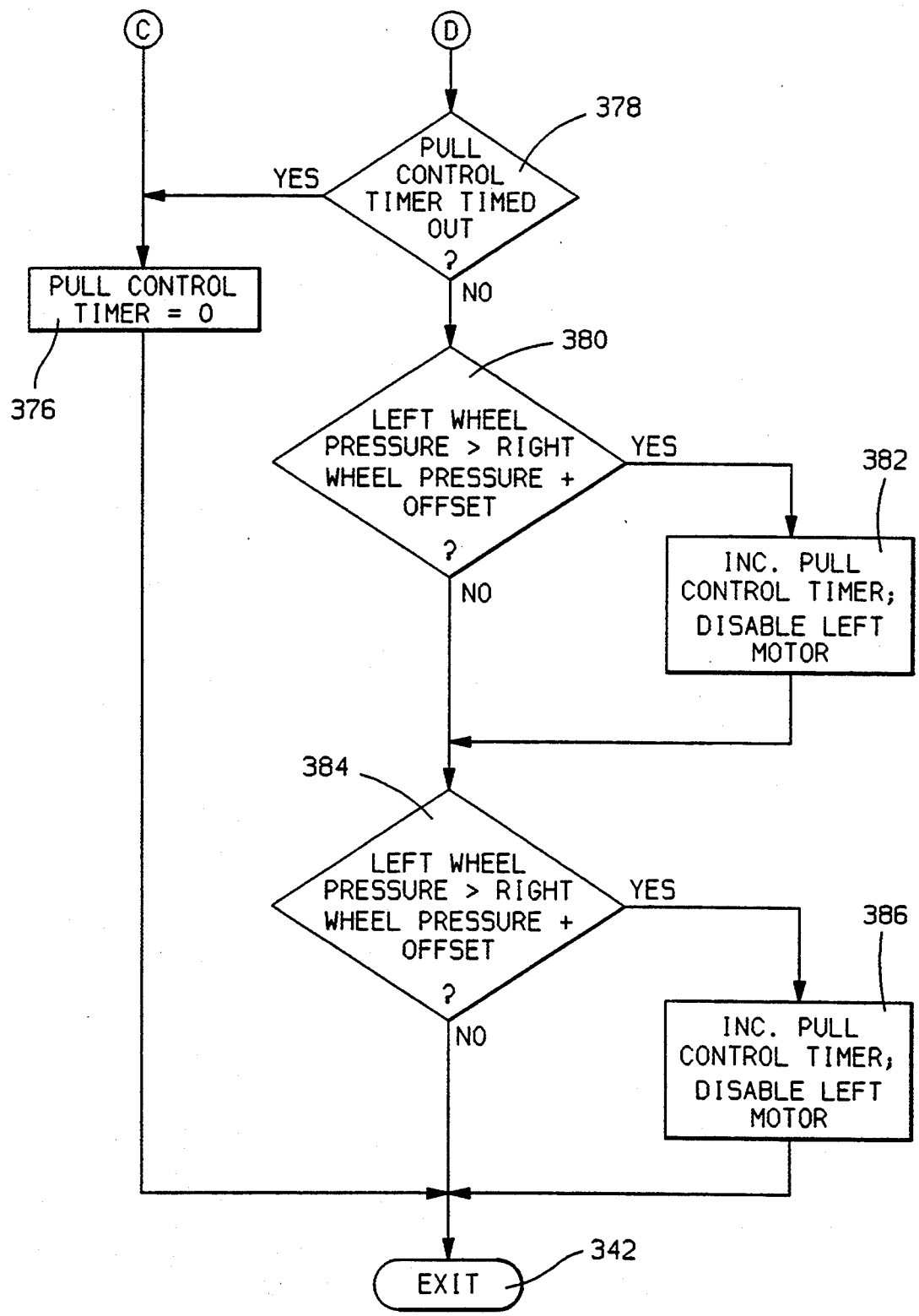

Referring to FIGS. 8a, 8b and 8c, the REGULATE MODULATOR PRESSURE subroutine begins at block 339. At block 340, the routine checks a flag to determine if the REGULATE MODULATOR PRESSURE subroutine is activated. If not, the routine exits at block 342. If yes, the routine moves to block 344 and checks a flag to determine if this is the first time through the REGULATE MODULATOR PRESSURE subroutine for the current brake command. If yes, WHEEL PRESSURE CONSTANT TIMER is set to zero and the command MOTOR BRAKES is set to OFF at block 346. The routine then continues to block 348 where the signal COMMAND PRESSURE is limited to a predetermined maximum value.

At block 350, the routine determines if the system is in APPLY TO RELEASE mode. This determination is made as follows: It is well known to those skilled in the an of antilock brake system to have apply and release modes of operating the brake actuators. Details on determining apply and release commands need not be set forth herein as their determination are well known to those skilled in the art. Each time the ABS routine determines a RELEASE mode command, if the previous mode command was an APPLY mode command, a timer is initiated and, until the timer times out, the system is in APPLY TO RELEASE mode at block 350. Block 350 simply checks the apply to release timer and if the timer has not yet timed out, moves to block 351, otherwise to block 352.

At block 351, the front error signals are set to zero and the command FRONT CONTROL COMMAND is set to FULL NEGATIVE. In this manner, when the front actuators move from apply to release, for a brief time period, the actuators are commanded to full negative, providing a burst of current through the actuator to reduce delay in the system and in the actuator when transitioning from apply to release. The brief time period depends on applied pressure (i.e, as represented by the last ABS APPLY command) and is obtained from a look-up table in response to the last APPLY command. The time periods for switching modes will vary from implementation to implementation and can be determined by one skilled in the art from a test system. After block 351, the routine moves to block 372.

At block 352, the routine checks to determine if the system is in RELEASE TO APPLY mode. This test is similar to the test at block 350. Every time the system sets an apply command, if the previous command was a release command, a timer is reset. Block 352 determines if the release to apply timer has timed out, if not, the routine moves to block 353. If so, the routine moves to block 354.

At block 353, the front error signals are set to zero and the command FRONT MOTOR COMMAND is set to FULL POSITIVE. In this manner, until the release to apply timer has timed out, the front actuator commands are commanded to full positive current to provide a short burst of current to move the actuator from release to apply quickly, reducing delay in the system and actuator motor. The time period depends on the APPLY command and is obtained from a look-up table in response to the APPLY command. The time periods can be predetermined by one skilled in the art in a test system and will vary from system to system. After block 353, the routine moves to block 372.

At block 354, the routine again checks to determine if it is in the ABS mode. If it is in the ABS mode, the ABS gains are retrieved from memory at block 356. If not in the ABS mode, the base brake gains are retrieved from memory at block 358. In general, the ABS PID gains are set to provide faster transitional response, while sacrificing stability. The base brake PID gains are generally set to provide consistent stable response, at a sacrifice to response speed. The actual gain values will vary from implementation to implementation and may be easily set by one skilled in the art to achieve the desired system response.

The routine then continues with blocks 360-364 where the closed loop control scheme is used to determine the front control command for each actuator. The routine then moves to block 366 where the front control command is compared to zero. If the front control command is greater than zero, the actuators are enabled in the forward direction at block 368 and if the front control command is not greater than zero, the motors are enabled in the reverse direction at block 370. At block 372, the ABS flag is checked. If the routine is in the ABS mode, the routine is exited at block 342.

If the system is not in the ABS mode, the routine moves to block 374 where the front motor commands are compared to the maximum value. If the front motor commands are not set to the maximum value, the routine sets the PULL CONTROL TIMER equal to zero at block 376 and exits at block 342. If the front motor commands are set to the maximum value at block 374, the routine moves to block 378 where PULL CONTROL TIMER is compared to the timed-out value. If PULL CONTROL TIMER is timed-out, the routine moves to block 342 and exits.

If PULL CONTROL TIMER is not timed-out, the routine moves to block 380 where LEFT WHEEL PRESSURE is compared to RIGHT WHEEL PRESSURE plus an offset. If LEFT WHEEL PRESSURE is greater than RIGHT WHEEL PRESSURE plus the offset, PULL CONTROL TIMER is incremented at block 382 and the left actuator motor is disabled.

The routine then continues to block 384 where RIGHT WHEEL PRESSURE is compared to LEFT WHEEL PRESSURE plus offset. If RIGHT WHEEL PRESSURE is greater than LEFT WHEEL PRESSURE plus the offset at block 384, then at block 386, PULL CONTROL TIMER is incremented and the right actuator motor is disabled. The routine then exits at block 342.

The routine described above provides closed loop control to the front actuators and regulates the left and right front actuators in response to each other so that, when not in the ABS mode, the pressure differential between left and right front brakes remains lower than a predetermined limit. The maintaining of the pressure differential between the left and right front brakes lower than a predetermined limit is similar to the function performed by the springs in the master cylinder of a conventional hydraulic brake system, which maintain the pressure between the hydraulic lines within a certain limit of each other.

When within the REGULATION state, if the SELECT MODE subroutine sets the CONSERVE ENERGY REQUEST flag to TRUE, and the CONSERVE ENERGY FAILURE flag is FALSE, the CONSERVE ENERGY subroutine is activated.

Figure 9A:
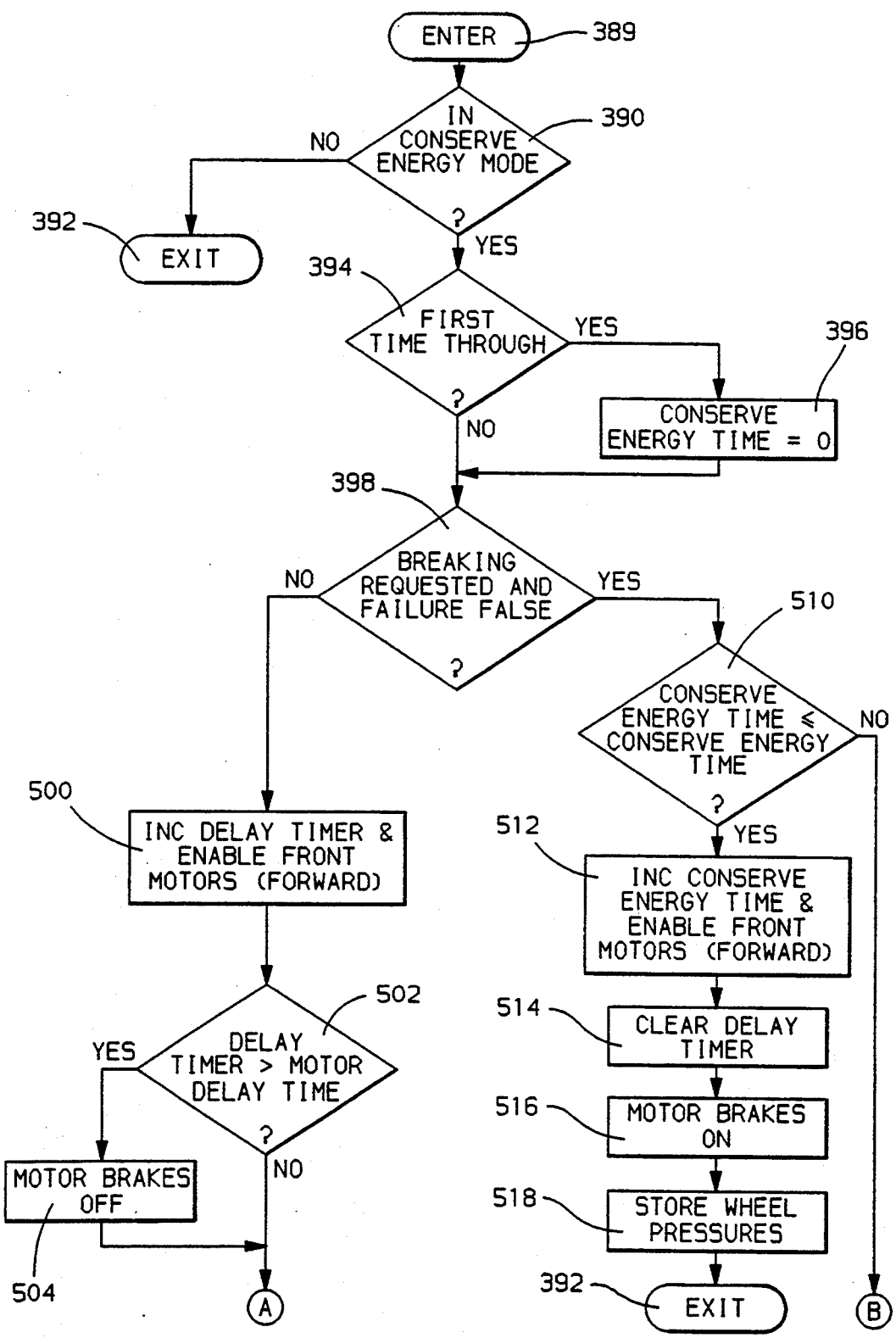
Figure 9B:
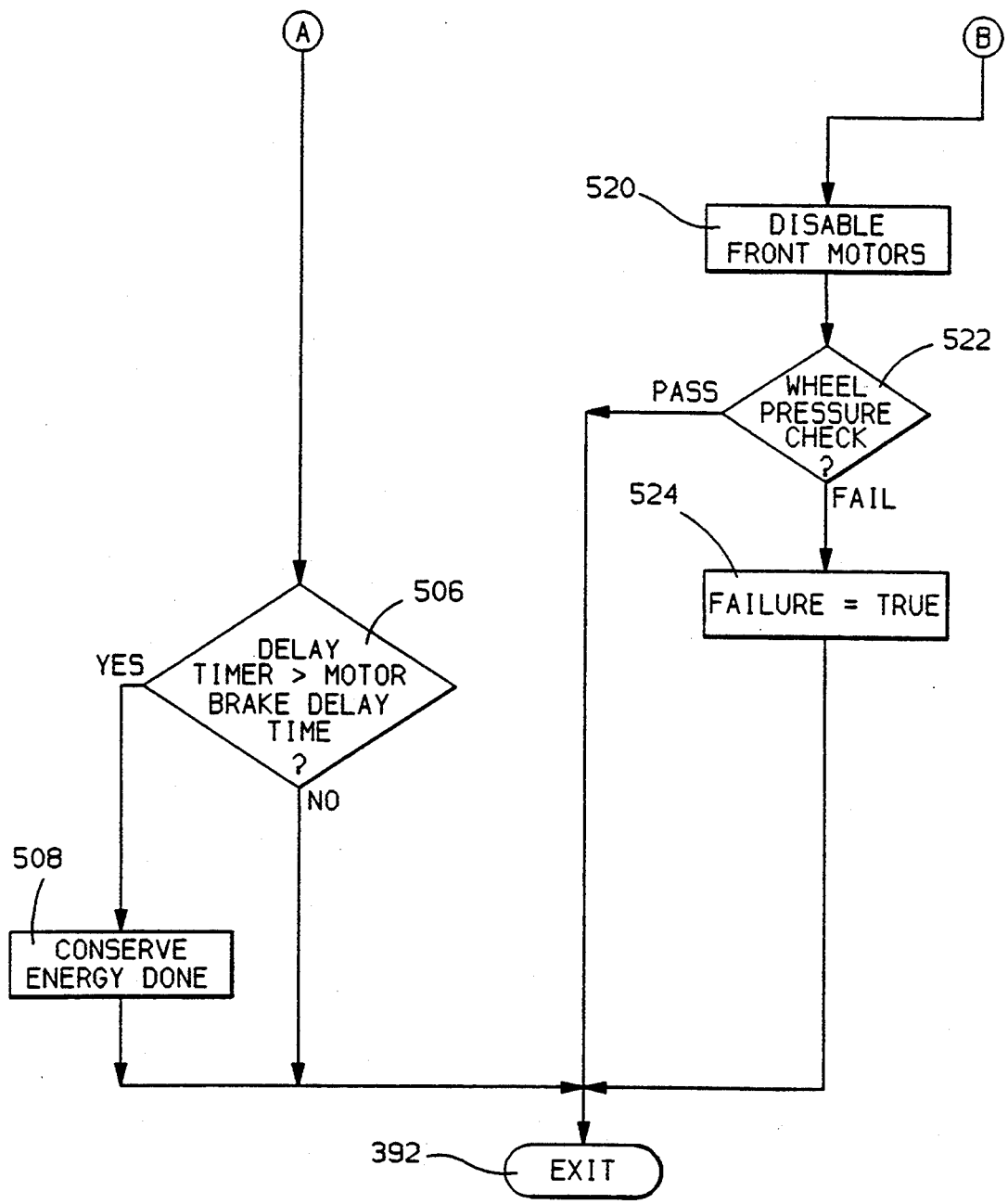

Referring to FIGS. 9a and 9b, the CONSERVE ENERGY subroutine begins at block 389 and moves to block 390, where the routine checks the CONSERVE ENERGY REQUEST flag to determine if the system is in the CONSERVE ENERGY state. If not, the routine exits at block 392. If so, the routine moves to block 394 where a flag is checked to indicate if this is the first loop through the conserve energy routine for this conserve energy flag. If this is the first time through the conserve energy routine, CONSERVE ENERGY TIMER is set to zero at block 396.

The routine then continues to block 398 where it checks to determine if braking is requested and if the CONSERVE ENERGY FAILURE flag is FALSE (this flag is reset to FALSE with each vehicle ignition cycle). If this test is not passed, the routine moves to block 500 where DELAY TIMER is incremented and the front actuator motors are enabled in the forward direction according to the control commands determined at block 364. The routine then moves to block 502 where DELAY TIMER is compared to the predetermined value of MOTOR DELAY TIME. If DELAY TIMER is not greater than MOTOR DELAY TIME, the routine advances to block 506. If DELAY TIMER is greater than MOTOR DELAY TIME, the command MOTOR BRAKES is set to OFF at block 504.

At block 506, DELAY TIMER is compared to the predetermined value for MOTOR BRAKE DELAY TIME. If DELAY TIMER is greater than MOTOR BRAKE DELAY TIME, the flag CONSERVE ENERGY DONE is set at block 508 and the routine is exited at block 392.

Referring again to block 398, if the test shown is passed, the routine moves to block 510 where CONSERVE ENERGY TIMER is compared to the predetermined value CONSERVE ENERGY TIME. If CONSERVE ENERGY TIMER is less than or equal to CONSERVE ENERGY TIME, the routine moves to block 512. If not, the routine moves to block 520 where the front motors are disabled, then to block 522 and/or block 392. At block 522, the actuator line pressures are checked and compared to each other. If they are within a predetermined bound around the stored WHEEL PRESSURE (stored at block 518), the routine is exited at block 392. If not, the flag CONSERVE ENERGY FAILURE is set to true at block 524 and the routine is exited at block 392.

Referring again to block 512, CONSERVE ENERGY TIMER is incremented and the front motors are enabled in the forward direction responsive to the front control commands determined at block 364. At block 514, DELAY TIMER is cleared and at block 516, the command MOTOR BRAKES is set to ON, turning on the motor brakes. The signals WHEEL PRESSURE are stored at block 518 and the routine is exited at block 392.

In the above manner, the controller maintains the brake actuators in a locked state with the electromagnetic motors disabling the main motors to save energy as long is braking is requested and maintained at a relatively constant pressure and as long as no failure is detected at the wheel pressure check, block 522. When in the CONSERVE ENERGY state, and either a failure is detected at the pressure check or the braking command is removed or changed so that it is no longer substantially constant, the control returns to the REGULATION state block 306, FIG. 6. If braking is no longer requested a modulator pressure is returned to zero, the control state moves to the HOMING state 304 where the routine described with reference to FIG. 11 is implemented.

Referring now to FIGS. 10a and 10b, the subroutine HOME MODULATOR starts at block 529 and moves to block 530 where it checks a flag to determine if the HOME MODULATOR subroutine is activated. If not, the subroutine is exited at block 532. If yes, the routine continues to block 534 where it checks a flag to determine if this is the first loop through the HOME MODULATOR subroutine for the present rehoming cycle. If the first time flag is set, the flag REHOME DONE is set to FALSE and STALL TIMER is set to zero at block 536.

The routine then continues to block 538 where the command MOTOR BRAKES is set to OFF and the flag RELEASE SOL is set to TRUE. At block 540, the motors are enabled in the reverse direction and at block 542, the measured value MOTOR FEEDBACK CURRENT, the sensed actuator current, is compared to the predetermined value MINIMUM CURRENT. If MOTOR FEEDBACK CURRENT is less than MINIMUM CURRENT, at block 544 the STALL TIMER is cleared and at block 546 the first time flag is rechecked. If the first time flag is true, at block 548, the command MOTOR COMMAND is set to the predetermined maximum MAX(REVERSE) and the routine moves to block 554. At block 546, if this is not the first time through the routine, the routine moves to block 550 where MOTOR COMMAND is set equal to MOTOR FEEDBACK CURRENT times a predetermined constant plus a predetermined value REHOME OFFSET. The routine then moves to block 554.

If at block 542 MOTOR FEEDBACK CURRENT is not less than MINIMUM CURRENT, the routine moves to block 552 where MOTOR COMMAND is set equal to the predetermined value HOLD COMMAND and STALL TIMER is incremented. At block 554, STALL TIMER is compared to its predetermined maximum value. If the test is passed, at block 556 the flag REHOME DONE is set to TRUE and MOTOR COMMAND is set equal to HOLD COMMAND. (Note: blocks 542-556 are performed for both the left and right brake actuators.)

The routine then continues to block 558 where it checks both the left and right REHOME DONE flags. If either of the REHOME DONE flags is FALSE, the command MOTOR BRAKES, is set to OFF at block 560. If both of the REHOME DONE flags are set to TRUE, the command MOTOR BRAKES is set to ON at block 562 and the actuator motors are disabled at block 558. The routine is then exited at block 532.

In the above manner, the front right and left brake actuator motors are rehomed after the brake pedal is released in the closed loop control responsive to current through the actuators described in U.S. Pat. No. 4,969,756, assigned to the assignee of this invention and having a disclosure incorporated herein by reference. Once rehoming is completed for both motors, the motors are disabled and the motor brakes are turned on to hold the actuators tightly with no line pressure, preventing rattles, shaking and vibrations in the vehicle from causing downstream pressure at the brake actuators.

In the above described manner, the hydraulic front brakes are driven according to the determined friction braking command to achieve total braking in combination with the regenerative braking provided by the front motor controller and front motor regeneration. As is known to those skilled in the art, any drive-by-wire brake system can be overridden by an ABS brake command which ABS brake command may be determined in a manner well known to those skilled in the art, and which command need not be set forth in further detail herein.

The above-described example implementations of this invention are not meant to be limiting on the scope of this invention. This invention is applicable to all vehicles, whether the vehicle has one or several drive electric motors, an internal combustion engine, or other type of motor, whether the control is divided between several microprocessor controllers or is incorporated into a signal microprocessor controller, and whether one of the brake systems described is used or whether an alternative brake system that can be driven by a command is used. Additionally, computer and discrete circuit substitutes are considered equivalents.

Moreover, various other improvements and modifications according to this invention may occur to those skilled in the art and such improvements and modifications will fall within the scope of this invention as set forth below.

The embodiments of the invention in which an exclusive property or privilege is claimed are:

1. In a vehicle brake system comprising at least one first brake device and at least one second brake device, wherein the first brake device provides friction braking responsive to a first command and wherein the second brake device provides vehicle braking responsive to a second command, a method of controlling the brake system comprising the steps of:
   determining if the one first brake device is operational;
   if the one first brake device is determined to be operational, determining the second command responsive to a brake pedal input and a first gain factor;
   if the one first brake device is determined to be not operational, determining the second command responsive to a brake pedal input and a second gain factor, wherein the first gain factor is greater than the second gain factor; and
   applying the second command to the second brake device.

2. The method of claim 1, wherein
   the first brake device is an actuator for controlling a hydraulic brake.

3. The method of claim 1, wherein the first brake device is an actuator for controlling a hydraulic brake, the second brake device is an electric drum brake, and the second command commands friction braking by the electric drum brake.

4. The method of claim 1, wherein the first gain factor corresponds to power-assisted braking by the first brake device and wherein the second gain factor corresponds to manual braking by the first brake device.

5. In a motor vehicle braking system wherein a first brake device has a first mode of operation in which power-assisted braking is provided and a second mode of operation in which manual braking is provided, wherein the second braking system has a second brake device controlled by a control command, a method of controlling the braking system comprising:
   receiving a signal indicative of an operator brake request;
   determining the control command in response to the signal and a first gain factor if the first brake device is in the first mode of operation;
   determining the control command in response to the signal and a second gain factor if the first brake device is in the second mode of operation, wherein the second gain factor is less than the first gain factor;
   applying the control command to the second brake device.

6. The method of claim 5 wherein the control command commands friction braking of rear electric brakes.

7. The method of claim 5, also comprising the steps of:
   determining an operational status of the first brake device;
   controlling the first brake device so that the first brake device is in the first mode of operation if the operational status indicates that the first brake device is operational to provide power-assisted braking;
   controlling the first brake device so that the first brake device is in the second mode of operation if the operational status indicates that the first brake device is not operational to provide power-assisted braking.

8. In a motor vehicle braking system wherein a first brake device has a first mode of operation in which power-assisted braking is provided and a second mode of operation in which manual braking is provided, wherein the second braking system has a second brake device controlled by a control command, a method of controlling the braking system comprising:
   receiving a signal indicative of an operator brake request;
   determining the control command in response to a product of the signal multiplied by a first gain factor if the first brake device is in the first mode of operation;
   determining the control command in response to a product of the signal multiplied by a second gain factor if the first brake device is in the second mode of operation, wherein the second gain factor is less than the first gain factor;
   applying the control command to the second brake device.

* * * * *